US011343881B2

(12) United States Patent
Lei et al.

(10) Patent No.: US 11,343,881 B2
(45) Date of Patent: May 24, 2022

(54) ELECTROMAGNETIC COOKING APPLIANCE AND METHOD FOR CONTROLLING POWER OF THE SAME

(71) Applicant: FOSHAN SHUNDE MIDEA ELECTRICAL HEATING APPLIANCES MANUFACTURING CO., LTD., Foshan (CN)

(72) Inventors: Jun Lei, Foshan (CN); Jaeeun Byun, Foshan (CN); Yunfeng Wang, Foshan (CN); Lutian Zeng, Foshan (CN); Deyong Jiang, Foshan (CN); Fan Zhang, Foshan (CN); Shufeng Huang, Foshan (CN); Wenhua Liu, Foshan (CN); Yuehong Qu, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 517 days.

(21) Appl. No.: 16/284,956

(22) Filed: Feb. 25, 2019

(65) Prior Publication Data

US 2019/0200421 A1     Jun. 27, 2019

Related U.S. Application Data

(63) Continuation of application No. PCT/CN2018/077602, filed on Feb. 28, 2018.

(30) Foreign Application Priority Data

Dec. 21, 2017   (CN) .......................... 201711390604.1

(51) Int. Cl.
*H05B 6/08*    (2006.01)
*H05B 6/06*    (2006.01)
(Continued)

(52) U.S. Cl.
CPC ................. *H05B 6/08* (2013.01); *H05B 6/04* (2013.01); *H05B 6/065* (2013.01); *H05B 6/1272* (2013.01);
(Continued)

(58) Field of Classification Search
CPC . H05B 6/04; H05B 6/065; H05B 6/08; H05B 6/1272; H05B 6/1281; H05B 6/362; H05B 6/44; Y02B 40/00
(Continued)

(56) References Cited

U.S. PATENT DOCUMENTS 5,951,904 A      9/1999  Jung et al.
2013/0334210 A1  12/2013  Takehira et al.
2013/0334212 A1* 12/2013  Sawada ................. H02M 5/458
                                              219/662

FOREIGN PATENT DOCUMENTS

CN    102809180 A    12/2012
CN    102980216 A    3/2013
(Continued)

OTHER PUBLICATIONS

Translation of CN103574706, Multi-burner induction cooker and heating control method, Feb. 1, 2014, by ProQuest (Year: 2014).*
(Continued)

*Primary Examiner* — Quang T Van
(74) *Attorney, Agent, or Firm* — Morgan, Lewis & Bockius LLP

(57) ABSTRACT

The present disclosure provides a method for controlling a power of an electromagnetic cooking appliance and an electromagnetic cooking appliance. The electromagnetic cooking appliance includes a first coil disk and a second coil disk. Each of the first coil disk and the second coil disk corresponds to an independent resonance circuit. After obtaining a target power of the electromagnetic cooking
(Continued)

appliance, a heating period of the electromagnetic cooking appliance is determined based on the target power, each heating period including at least one first heating time period and at least one second heating time period. The first coil disk is controlled to heat in the first heating time period, and the second coil disk to heat in the second heating time period, such that the first coil disk and the second coil disk are heated alternately to reduce an interference of harmonic current and voltage flicker.

17 Claims, 9 Drawing Sheets

(51) Int. Cl.
H05B 6/44 (2006.01)
H05B 6/36 (2006.01)
H05B 6/12 (2006.01)
H05B 6/04 (2006.01)

(52) U.S. Cl.
CPC .......... H05B 6/1281 (2013.01); H05B 6/362 (2013.01); H05B 6/44 (2013.01)

(58) Field of Classification Search
USPC ....... 219/663, 661, 662, 664, 665, 668, 675, 219/620, 624, 625, 632; 318/463, 465, 318/475; 363/57
See application file for complete search history.

(56) References Cited

FOREIGN PATENT DOCUMENTS

| | | | |
|---|---|---|---|
| CN | 103416104 | A | 11/2013 |
| CN | 103574706 | A | 2/2014 |
| CN | 103596307 | A | 2/2014 |
| CN | 103 931272 | A | 7/2014 |
| CN | 204410586 | U | 6/2015 |
| CN | 107302809 | A | 10/2017 |
| EP | 2355617 | A2 | 8/2011 |
| EP | 2790466 | A1 | 10/2014 |
| EP | 3110232 | A1 | 12/2016 |
| JP | H09185986 | A | 7/1997 |
| JP | 2003083543 | A | 3/2003 |
| JP | 20080052120 | | 9/2009 |
| JP | 5156435 | B2 | 3/2013 |
| KR | 20110092071 | A | 8/2011 |
| WO | WO2013/061595 | A1 | 5/2013 |
| WO | WO2013084386 | A1 | 6/2013 |

OTHER PUBLICATIONS

Foshan Shunde Midea Electrical Heating Appliances Manufacturing Co. Ltd., Extended European Search Report, EP18773064.3, dated May 21, 2019, 7 pgs.
Foshan Shunde Midea Electrical Heating Appliances Manufacturing Co. Ltd., International Search Report and Written Opinion, PCT/CN2018/077602, dated Aug. 1, 2018, 13 pgs.
Foshan Shunde Midea Electrical Heating Appliances Manufacturing Co. Ltd., First Office Action, CN2017113 90604,1, dated Oct. 12, 2019, 12 pgs.
Foshan Shunde Midea Electrical Heating Appliances Manufacturing Co. Ltd., Notification of Reason for Refusal, KR1020187019239, dated Sep. 23, 2019, 11 pgs.
Foshan Shunde Midea Electrical Heating Appliances Manufacturing Co. Ltd., Notification of Reason for Refusal, JP2018544264, dated Jan. 21, 2020, 6 pgs.

* cited by examiner

ELECTROMAGNETIC COOKING APPLIANCE AND METHOD FOR CONTROLLING POWER OF THE SAME

CROSS-REFERENCE TO RELATED APPLICATIONS

This patent application is a continuation application of PCT Patent Application No. PCT/CN2018/077602, entitled "ELECTROMAGNETIC COOKING APPLIANCE AND METHOD FOR CONTROLLING POWER OF THE SAME" filed on Feb. 28, 2018, which claims priority to Chinese Patent Application No. 201711390604.1, entitled "ELECTROMAGNETIC COOKING APPLIANCE AND METHOD FOR CONTROLLING POWER OF THE SAME" filed with Chinese Patent Office on Dec. 21, 2017, both of which are incorporated herein by reference in their entirety.

TECHNICAL FIELD

The present disclosure relates to a field of household appliances, and more particularly to a method for controlling a power of an electromagnetic cooking appliance, and an electromagnetic cooking appliance.

BACKGROUND

An electromagnetic cooking appliance usually heats intermittently in a low-power output, which may interfere the power grid, such as harmonic current, voltage flicker, etc.

SUMMARY

The present disclosure aims to solve one of the technical problems in the related art to at least some extent. Therefore, a first objective of the present disclosure is to provide a method for controlling a power of an electromagnetic cooking appliance, which may realize to switch heating in high speed on a plurality of coil disks, to heat with different powers, and further to reduce an interference of harmonic current and voltage flicker.

A second objective of the present disclosure is to provide a non-transitory computer readable storage medium.

A third objective of the present disclosure is to provide an electromagnetic cooking appliance.

To achieve the above objective, a first aspect of the embodiments of the present disclosure provides a method for controlling a power of an electromagnetic cooking appliance. The electromagnetic cooking appliance includes a first coil disk and a second coil disk. Each of the first coil disk and the second coil disk corresponds to an independent resonance circuit. The method for controlling the power includes the following steps: obtaining a target power of the electromagnetic cooking appliance; determining a heating period of the electromagnetic cooking appliance based on the target power, in which, each heating period includes at least one first heating time period and at least one second heating time period; controlling the first coil disk to heat in the first heating time period, and controlling the second coil disk to heat in the second heating time period, in which, each first heating time period is followed by the second heating time period to make the first coil disk and the second coil disk heat alternately.

With the method for controlling the power of the electromagnetic cooking appliance according to one or more embodiments of the present disclosure, the target power of the electromagnetic cooking appliance is obtained; the heating period of the electromagnetic cooking appliance is determined based on the target power, in which, each heating period comprises at least one first heating time period and at least one second heating time period; and the first coil disk is controlled to heat in the first heating time period, and the second coil disk is controlled to heat in the second heating time period, in which, each first heating time period is followed by the second heating time period to make the first coil disk and the second coil disk heat alternately. Therefore, the method may realize to switch heating in high speed on a plurality of coil disks, to heat with different powers, and further to reduce an interference of harmonic current and voltage flicker.

Additionally, the method for controlling the power of the electromagnetic cooking appliance provided in the above embodiments of the present disclosure may have the following additional technical features.

In an embodiment of the present disclosure, each first heating time period and each second heating time period respectively correspond to at least one half-wave period of an input alternating current (AC) power supply.

In an embodiment of the present disclosure, each heating period includes four half-wave periods of the AC power supply, in which, the first heating time period includes a first half-wave period and a second half-wave period, the second heating time period includes a third half-wave period, and both the first coil disk and the second coil disk stop heating in a fourth half-wave period.

In an embodiment of the present disclosure, each heating period includes eight half-wave periods of the AC power supply, and there are two first heating time periods and two second heating time periods, in which, a first one of the two first heating time periods includes a first half-wave period and a second half-wave period, a first one of the two second heating time periods includes a third half-wave period, a second one of the two first heating time periods includes a fifth half-wave period, a second one of the two second heating time periods includes a sixth half-wave period, and both the first coil disk and the second coil disk stop heating in a fourth half-wave period, a seventh half-wave period and an eighth half-wave period.

In an embodiment of the present disclosure, each heating period includes sixteen half-wave periods of the AC power supply, and there are four first heating time periods and four second heating time periods, in which, a first one of the four first heating time periods includes a first half-wave period and a second half-wave period, a first one of the four second heating time periods includes a third half-wave period, a second one of the four first heating time periods includes a fifth half-wave period and a sixth half-wave period, a second one of the four second heating time periods includes a seventh half-wave period, a third one of the four first heating time periods includes a ninth half-wave period, a third one of the four second heating time periods includes a tenth half-wave period, a fourth one of the four first heating time periods includes a thirteenth half-wave period, a fourth one of the four second heating time periods includes a fourteenth half-wave period, and both the first coil disk and the second coil disk stop heating in a fourth half-wave period, an eighth half-wave period, an eleventh half-wave period, a twelfth half-wave period, a fifteenth half-wave period and a sixteenth half-wave period.

In an embodiment of the present disclosure, each heating period includes eight half-wave periods of the AC power supply, and there are two first heating time periods and two second heating time periods, in which, a first one of the two first heating time periods includes a first half-wave period, a second half-wave period and a third half-wave period, a first one of the two second heating time periods includes a fourth half-wave period, a second one of the two first heating time periods includes a fifth half-wave period and a sixth half-wave period, and a second one of the two second heating time periods includes a seventh half-wave period and an eighth half-wave period.

In an embodiment of the present disclosure, each heating period includes sixteen half-wave periods of the AC power supply, and there are four first heating time periods and four second heating time periods, in which, a first one of the four first heating time periods includes a first half-wave period, a second half-wave period and a third half-wave period, a first one of the four second heating time periods includes a fourth half-wave period, a second one of the four first heating time periods includes a fifth half-wave period, a sixth half-wave period and a seventh half-wave period, a second one of the four second heating time periods includes an eighth half-wave period, a third one of the four first heating time periods includes a ninth half-wave period and a tenth half-wave period, a third one of the four second heating time periods includes an eleventh half-wave period and a twelfth half-wave period, a fourth one of the four first heating time periods includes a thirteenth half-wave period and a fourteenth half-wave period, and a fourth one of the four second heating time periods includes a fifteenth half-wave period and a sixteenth half-wave period.

In an embodiment of the present disclosure, the first coil disk and the second coil disk are disposed concentrically or adjacently.

To achieve the above objective, a second aspect of the embodiments of the present disclosure provides a non-transitory computer readable storage medium having stored computer programs thereon. The method for controlling the power of the electromagnetic cooking appliance described above is implemented when the programs are performed by a processor.

With the non-transitory computer readable storage medium according to one or more embodiments of the present disclosure, by performing the method for controlling the power of the electromagnetic cooking appliance described above, it may realize to switch heating in high speed on a plurality of coil disks, to heat with different powers, and further to reduce an interference of harmonic current and voltage flicker.

To achieve the above objective, a third aspect of the embodiments of the present disclosure provides an electromagnetic cooking appliance, including a first coil disk, a second coil disk, a memory, a processor and programs stored in the memory and executed by the processor for controlling the power of the electromagnetic cooking appliance. Each of the first coil disk and the second coil disk corresponds to an independent resonance circuit. The programs are performed by the processor to realize the method for controlling the power of the electromagnetic cooking appliance described above.

With the electromagnetic cooking appliance according to one or more embodiments of the present disclosure, by the method for controlling the power of the electromagnetic cooking appliance described above, it may realize to switch heating in high speed on a plurality of coil disks, to heat with different powers, and further to reduce an interference of harmonic current and voltage flicker.

DETAILED DESCRIPTION OF EMBODIMENTS

Reference will now be made in detail to the embodiments of the present disclosure, examples of which are illustrated in the accompanying drawings, in which the same or similar numbers represent the same or similar elements or the elements with the same or similar function. The embodiments described in the following accompany drawings are exemplary, only for purpose of description of the present disclosure, but not constructed to limit the present disclosure.

A method for controlling a power of an electromagnetic cooking appliance and an electromagnetic cooking appliance according to the embodiments of the present disclosure will be described below with reference to the accompanying drawings.

Figure 1:
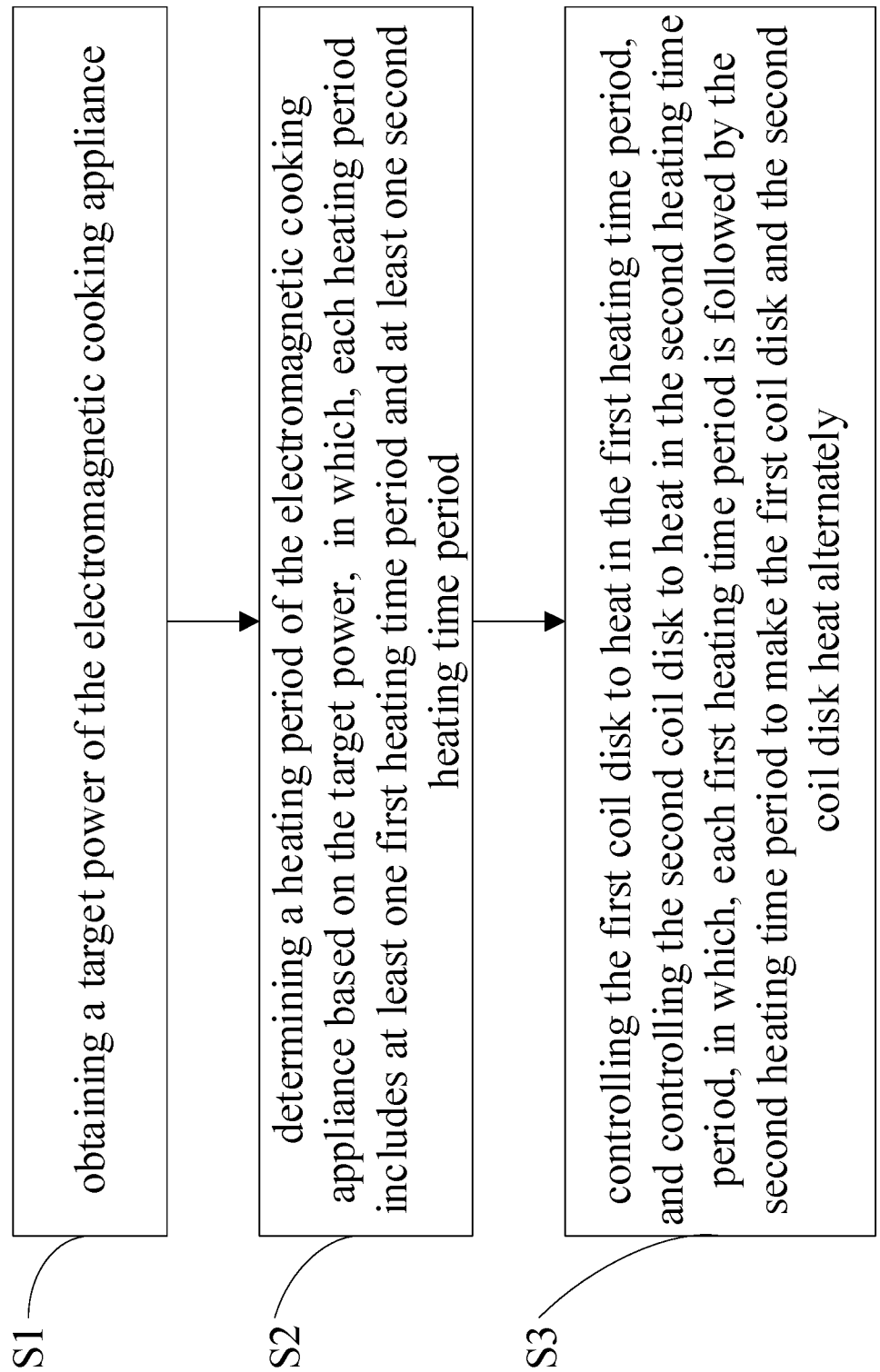
FIG. 1 is a flow chart illustrating a method for controlling a power of an electromagnetic cooking appliance according to one or more embodiments of the present disclosure.

FIG. 1 is a flow chart illustrating a method for controlling a power of an electromagnetic cooking appliance according to one or more embodiments of the present disclosure.

Figure 2:
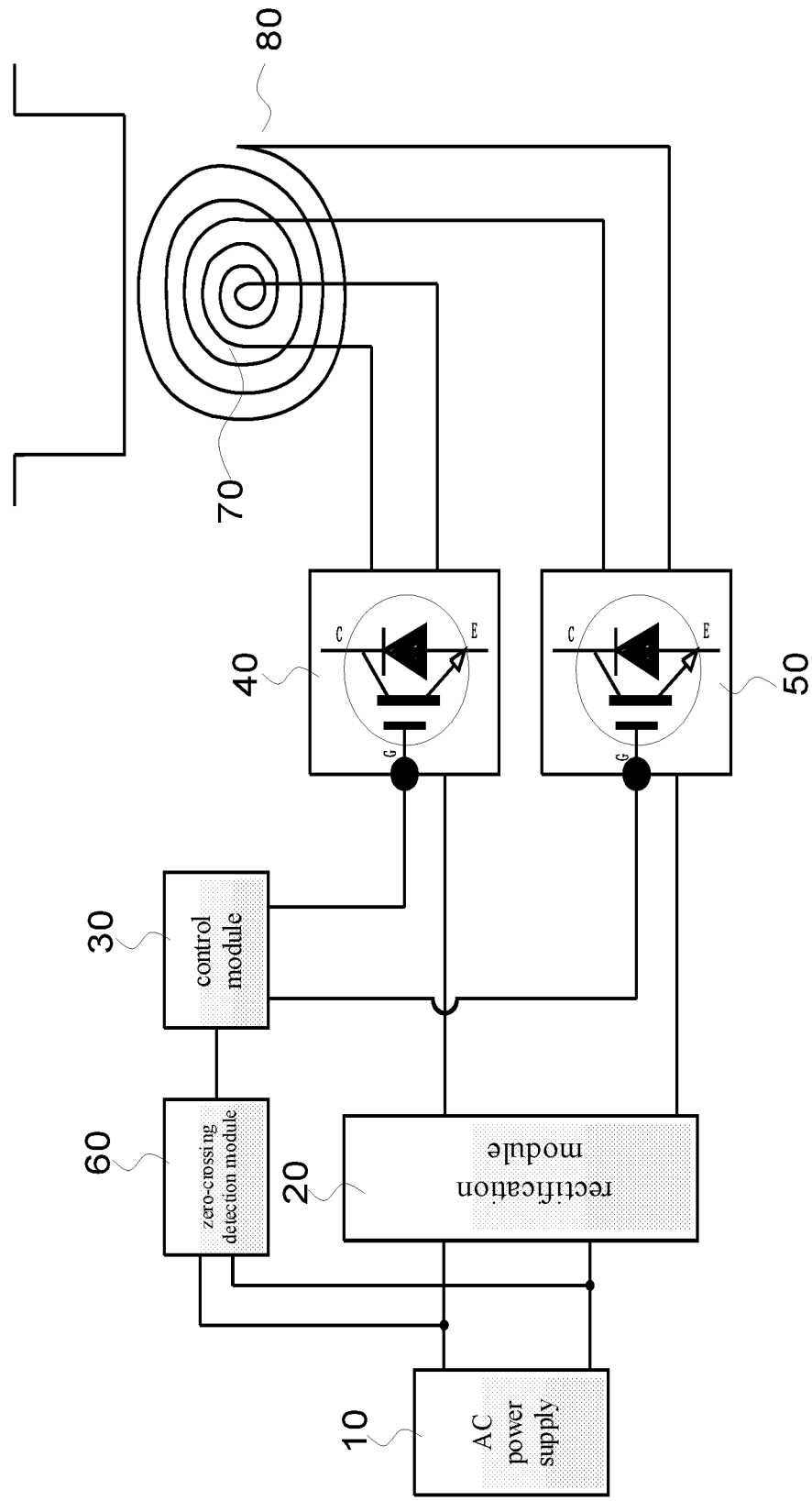
FIG. 2 is a schematic diagram illustrating a drive control circuit of an electromagnetic cooking appliance according to one or more embodiments of the present disclosure.
Figure 3:
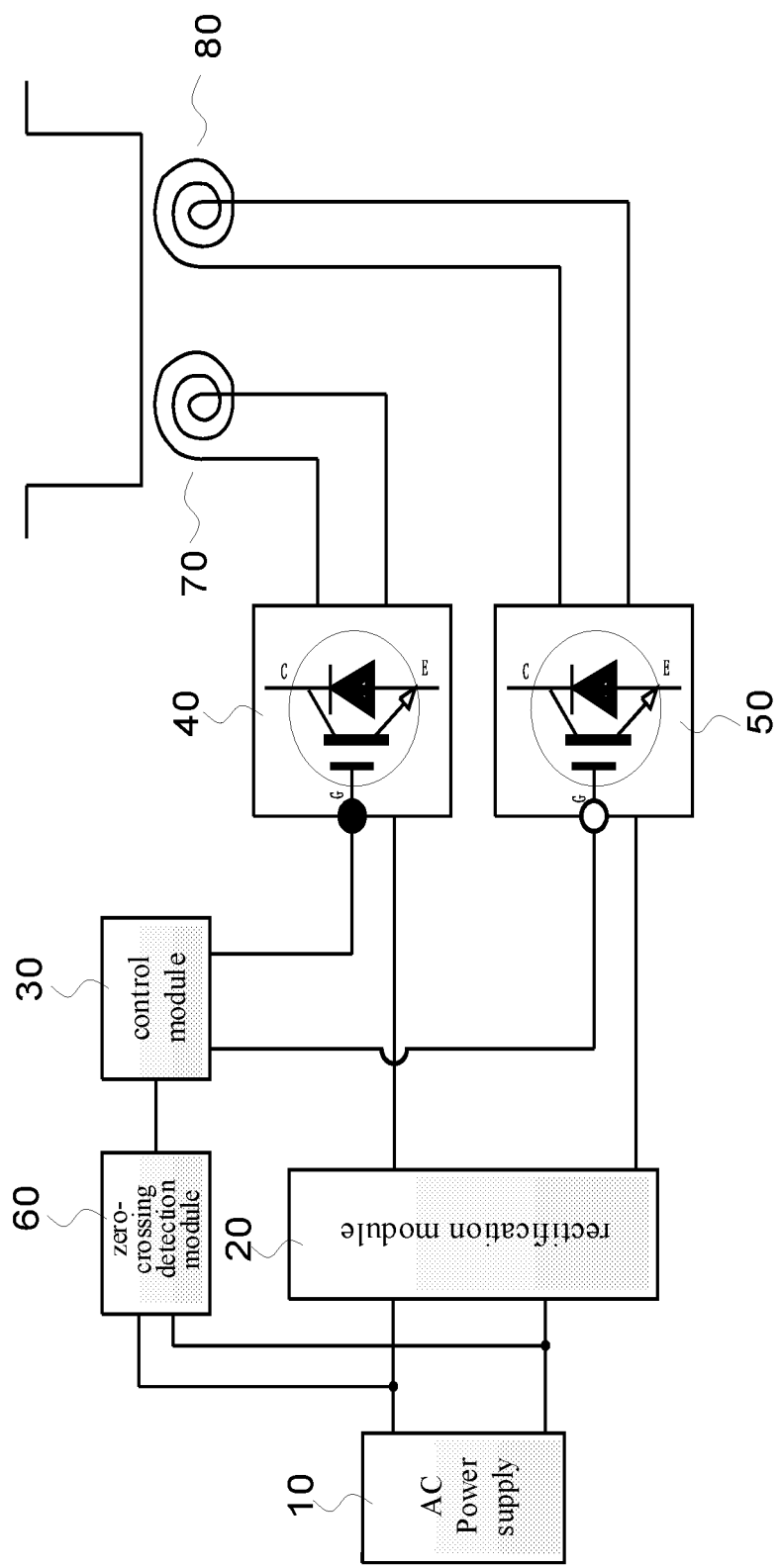
FIG. 3 is a schematic diagram illustrating another drive control circuit of an electromagnetic cooking appliance according to one or more embodiments of the present disclosure.

In one or more embodiments of the present disclosure, as illustrated in FIG. 2 and FIG. 3, the electromagnetic cooking appliance may include a first coil disk 70 and a second coil disk 80. Each of the first coil disk 70 and the second coil disk 80 corresponds to an independent resonance circuit. As illustrated in FIG. 2, the first coil disk 70 and the second coil disk 80 may be disposed concentrically. Or as illustrated in FIG. 3, the first coil disk 70 and the second coil disk 80 may be disposed adjacently.

In detail, as illustrated in FIG. 2 and FIG. 3, a drive control circuit of the electromagnetic cooking appliance may include an alternating current (AC) power supply 10, a rectification module 20, a control module 30, a first switch module 40, a second switch module 50 and a zero-crossing detection module 60. The first switch module 40 and the second switch module 50 may be an insulated gate bipolar translator (IGBT). Each of the first coil disk 70 and the second coil disk 80 has an independent resonance circuit. That is, the first switch module 40 is configured to control the first coil disk 70 to turn on or off, and the second switch module 50 is configured to control the second coil disk 80 to turn on or off. The zero-crossing detection module 60 is configured to detect a zero-crossing signal of the AC power supply. The rectification module 20 is configured to rectify the input AC power supply into a direct current (DC) power. The switch module is configured to invert the rectified DC signal into a high frequency signal above 20 KHz. The high frequency signal may be changed from an electrical signal into an alternating electromagnetic signal by the coil disk. The electromagnetic cooking appliance (a heated body) generates an eddy current and a hysteresis motion in the alternating electromagnetic signal, thereby generating energy.

Figure 4:
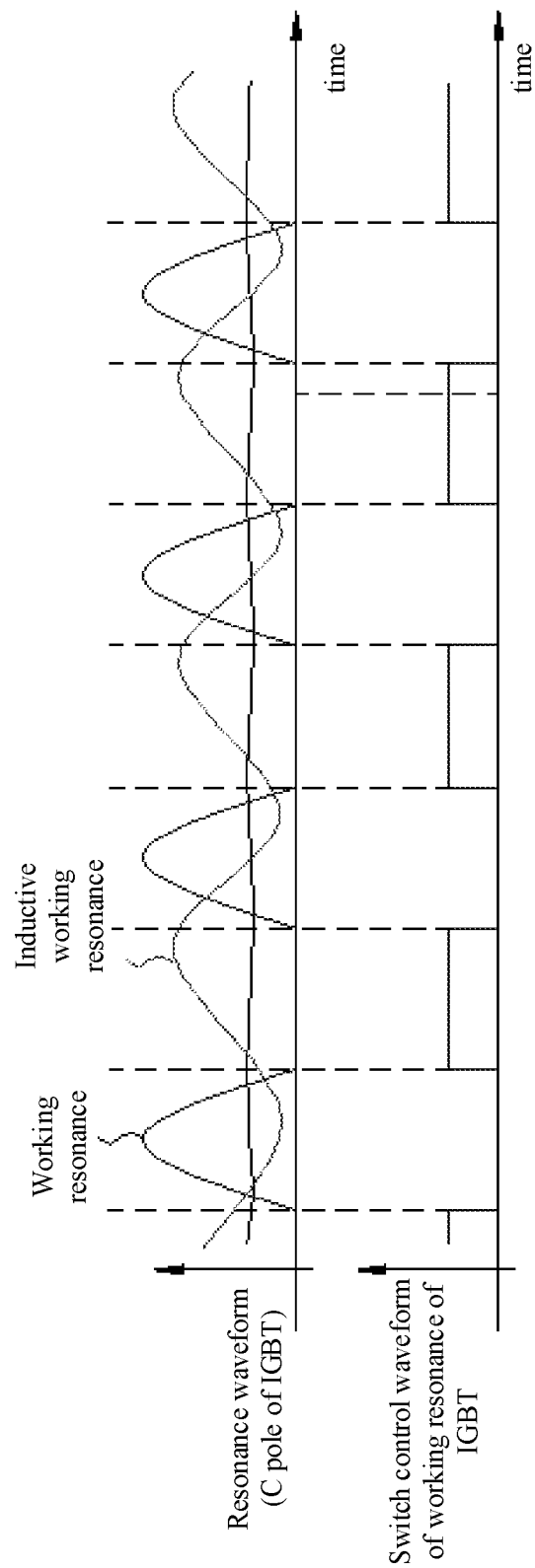
FIG. 4 is a waveform diagram illustrating a method for controlling a power of an electromagnetic cooking appliance according to one or more embodiments of the present disclosure.

As illustrated in FIG. 4, when one of the switch modules controls the corresponding coil disk to operate, an alternating magnetic field is generated around the coil disk and around the heated body, and the coil disk that is not controlled by the switch module will generate a follow-up resonance with the same frequency in the alternating magnetic field. An arrival times of the two resonances to reach a valley are very close.

As illustrated in FIG. 1, the method for controlling the power of the electromagnetic cooking appliance according to one or more embodiments of the present disclosure may include the following steps.

S1, a target power of the electromagnetic cooking appliance is obtained.

S2, a heating period of the electromagnetic cooking appliance is determined based on the target power. Each heating period includes at least one first heating time period and at least one second heating time period. In one or more embodiments of the present disclosure, each first heating time period and each second heating time period respectively correspond to at least one half-wave period of the input AC power supply.

The number of half-wave periods of the input AC power supply corresponding to each first heating time period is the same as or different from that corresponding to each second heating time period. When there are a plurality of first heating time periods, the number of half-wave periods of the input AC power supply corresponding to each first heating time period may be the same or different. When there are a plurality of second heating time periods, the number of half-wave periods of the input AC power supply corresponding to each second heating time period may be the same or different.

S3, the first coil disk is controlled to heat in the first heating time period, and the second coil disk is controlled to heat in the second heating time period. Each first heating time period is followed by the second heating time period to make the first coil disk and the second coil disk heat alternately.

In detail, the target power of the electromagnetic cooking appliance is obtained after the electromagnetic cooking appliance is powered on, and then the heating period of the electromagnetic cooking appliance is determined based on the target power. Each heating period may include at least one first heating time period and at least one second heating time period. One first heating time period and one second heating time period constitute one minimum heating period. The heating period of the electromagnetic cooking appliance may include at least one minimum heating period. The second coil disk is not controlled to heat when the first coil disk is controlled to heat in the first heating time period, and the first coil disk is not controlled to heat when the second coil disk is controlled to heat in the second heating time period. The first coil disk and the second coil disk are controlled to heat intermittently, and the second coil disk is followed to heat after the first coil disk heats (the second heating time period is followed by the first heating time period) to make the first coil disk and the second coil disk heat alternately. The first coil disk and the second coil disk heat circularly in the whole heating period until a present power of the electromagnetic cooking appliance reaches a preset target power.

The present heating power of the electromagnetic cooking appliance is a sum of a heating power of the first coil disk for each first heating time period and a heating power of the second coil disk for each second heating time period.

The number of the half-wave periods of the AC power supply included in each of the first heating time period and the second heating time period in each heating period will be described below.

In a first embodiment of the present disclosure, each heating period includes four half-wave periods of the AC power supply. A first heating time period includes a first half-wave period and a second half-wave period, and a second heating time period includes a third half-wave period, and both the first coil disk and the second coil disk stop heating in a fourth half-wave period.

Figure 5:
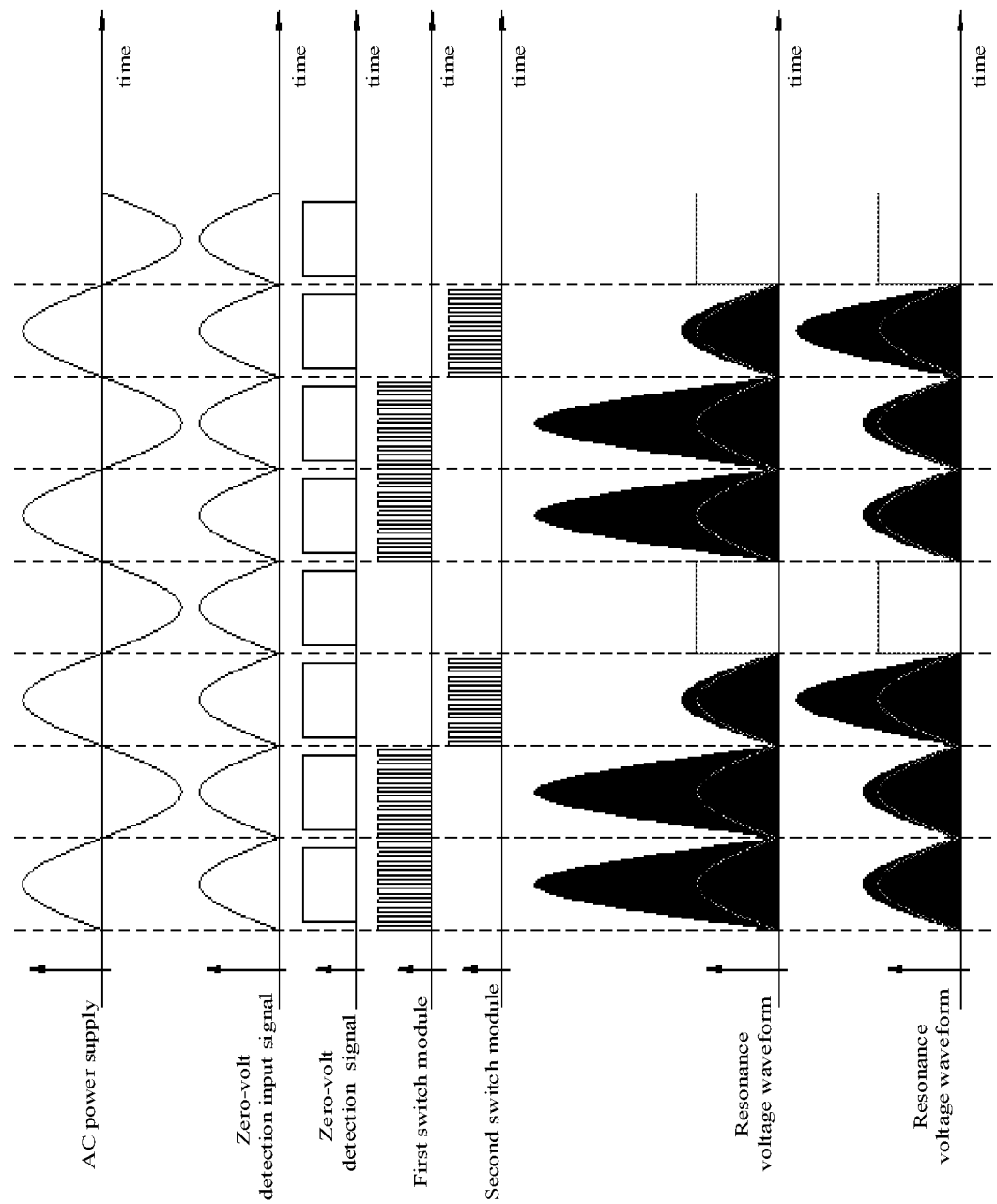
FIG. 5 is a resonant waveform diagram illustrating a method for controlling a power of an electromagnetic cooking appliance according to a first embodiment of the present disclosure.

Namely, as illustrated in FIG. 5, there are one first heating time period and one second heating time period. The first switch module is turned on in the first half-wave period and the second half-wave period, for controlling the first coil disk to heat, while the second switch module is turned off. The second switch module is turned on in the third half-wave period, for controlling the second coil disk to heat, while the first switch module is turned off. Therefore, the first coil disk and the second coil disk heat intermittently. The first switch module and the second switch module are turned off in the fourth half-wave period, such that when the first coil disk and the second coil disk stop heating, the heating power of the first coil disk and the heating power of the second coil disk are adjusted according to the target power of the electromagnetic cooking appliance and an average power of the first coil disk and the second coil disk (the average power=a power sum of the first coil disk and the second coil disk for each half-wave period/the heating period).

In a second embodiment of the present disclosure, each heating period includes eight half-wave periods of the AC power supply, and there are two first heating time periods and two second heating time periods. A first one of the two first heating time periods includes a first half-wave period and a second half-wave period, a first one of the two second heating time periods includes a third half-wave period, a second one of the two first heating time periods includes a fifth half-wave period, a second one of the two second heating time periods includes a sixth half-wave period, and both the first coil disk and the second coil disk stop heating in a fourth half-wave period, a seventh half-wave period and an eighth half-wave period.

Figure 6:
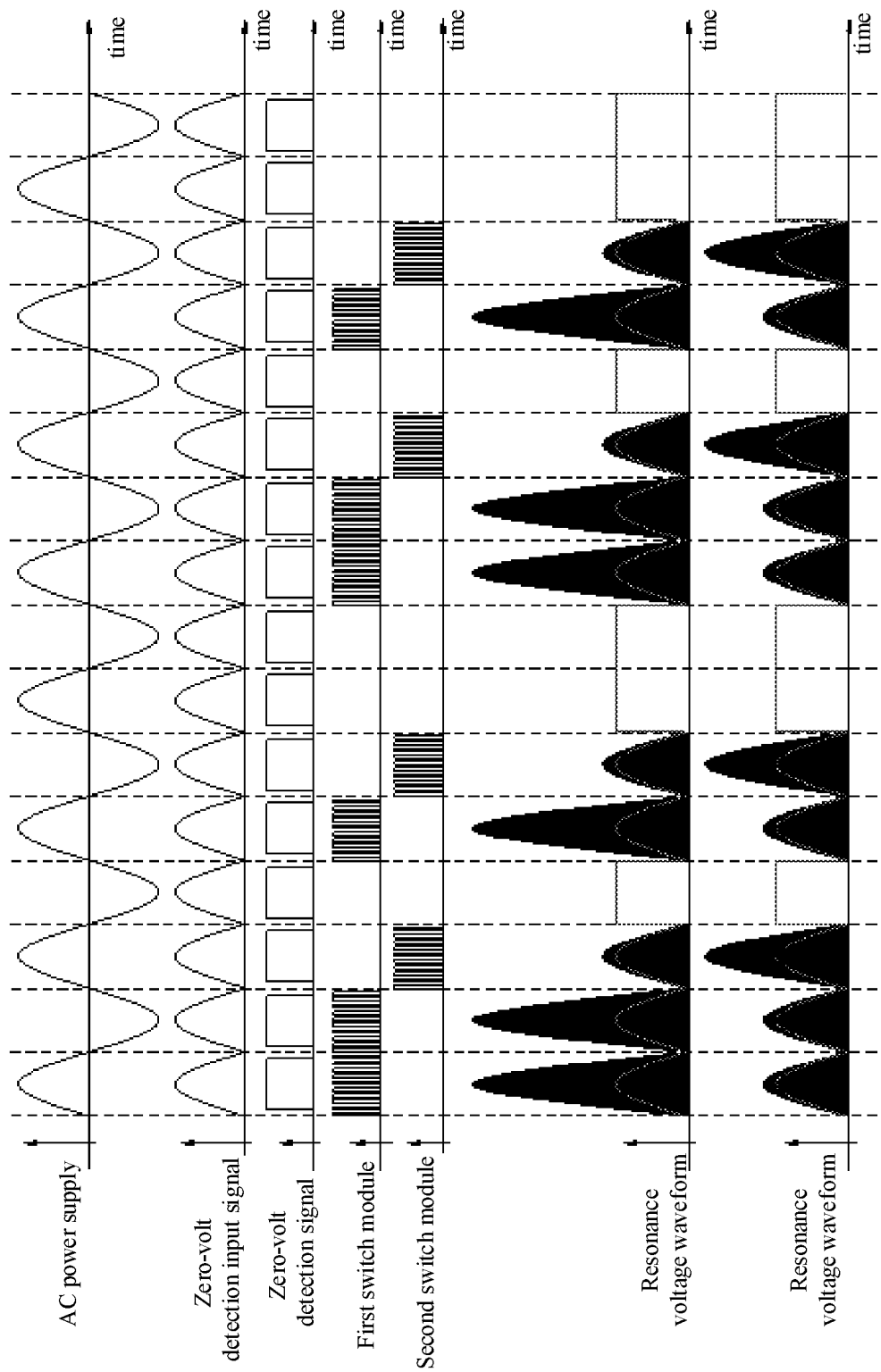
FIG. 6 is a resonant waveform diagram illustrating a method for controlling a power of an electromagnetic cooking appliance according to a second embodiment of the present disclosure.

Namely, as illustrated in FIG. 6, each heating period includes two first heating time periods and two second heating time periods, and the two first heating time periods respectively correspond to different heating powers (the two first heating time periods include different numbers of the half-wave periods of the AC power supply). The first switch module is turned on in the first half-wave period, the second half-wave period and the fifth half-wave period, for controlling the first coil disk to heat, while the second switch module is turned off; the second switch module is turned on in the third half-wave period and the sixth half-wave period, for controlling the second coil disk to heat, while the first switch module is turned off; the first switch module and the second switch module is turned off in the fourth half-wave period, the seventh half-wave period and the eighth half-wave period, both the first coil disk and the second coil disk stop heating, and the heating power of the first coil disk and the heating power of the second coil disk are adjusted according to the target power of the electromagnetic cooking appliance and an average power of the first coil disk and the second coil disk.

In a third embodiment of the present disclosure, each heating period includes sixteen half-wave periods of the AC power supply, and there are four first heating time periods and four second heating time periods. A first one of the four first heating time periods includes a first half-wave period and a second half-wave period, a first one of the four second heating time periods includes a third half-wave period, a second one of the four first heating time periods includes a fifth half-wave period and a sixth half-wave period, a second one of the four second heating time periods includes a seventh half-wave period, a third one of the four first heating time periods includes a ninth half-wave period, a third one of the four second heating time periods includes a tenth half-wave period, a fourth one of the four first heating time periods includes a thirteenth half-wave period, a fourth one of the four second heating time periods includes a fourteenth half-wave period, and both the first coil disk and the second coil disk stop heating in a fourth half-wave period, an eighth half-wave period, an eleventh half-wave period, a twelfth half-wave period, a fifteenth half-wave period and a sixteenth half-wave period.

Figure 7:
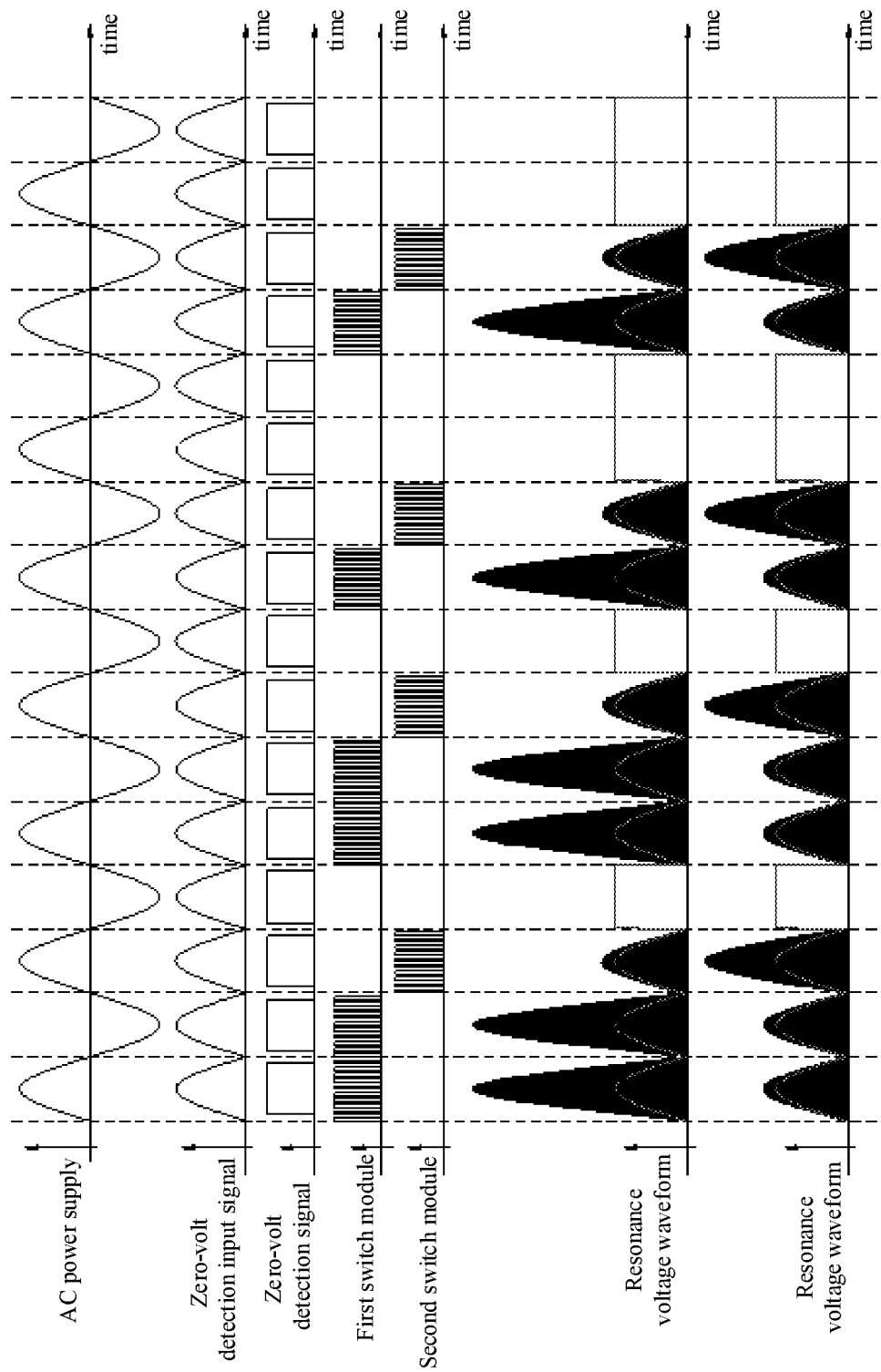
FIG. 7 is a resonant waveform diagram illustrating a method for controlling a power of an electromagnetic cooking appliance according to a third embodiment of the present disclosure.

Namely, as illustrated in FIG. 7, each heating period includes four first heating time periods and four second heating time periods, and the heating powers of the first one of the first heating time periods and the second one of the first heating time periods are different from the heating powers of the third one of the first heating time periods and the fourth one of the first heating time periods (the first one of the first heating time periods and the second one of the first heating time periods have the numbers of the half-wave periods of the AC power supply different from the third one of the first heating time periods and the fourth one of the first heating time periods). The first switch module is turned on in the first half-wave period, the second half-wave period, the fifth half-wave period, the sixth half-wave period, the nine half-wave period and the thirteenth half-wave period, for controlling the first coil disk to heat, while the second switch module is turned off; the second switch module is turned on in the third half-wave period, the seventh half-wave period, the tenth half-wave period and the fourteenth half-wave period, for controlling the second coil disk to heat, while the first switch module is turned off; the first switch module and the second switch module are turned off in the fourth half-wave period, the eighth half-wave period, the eleventh half-wave period, the twelfth half-wave period the fifteenth half-wave period and the sixteenth half-wave period, both the first coil disk and the second coil disk stop heating, and the heating power of the first coil disk and the heating power of the second coil disk are adjusted according to the target power of the electromagnetic cooking appliance and an average power of the first coil disk and the second coil disk.

In a fourth embodiment of the present disclosure, each heating period includes eight half-wave periods of the AC power supply and there are two first heating time periods and two second heating time periods. A first one of the two first heating time periods includes a first half-wave period, a second half-wave period and a third half-wave period, a first one of the two second heating time periods includes a fourth half-wave period, a second one of the two first heating time periods includes a fifth half-wave period and a sixth half-wave period, and a second one of the two second heating time periods includes a seventh half-wave period and an eighth half-wave period.

Figure 8:
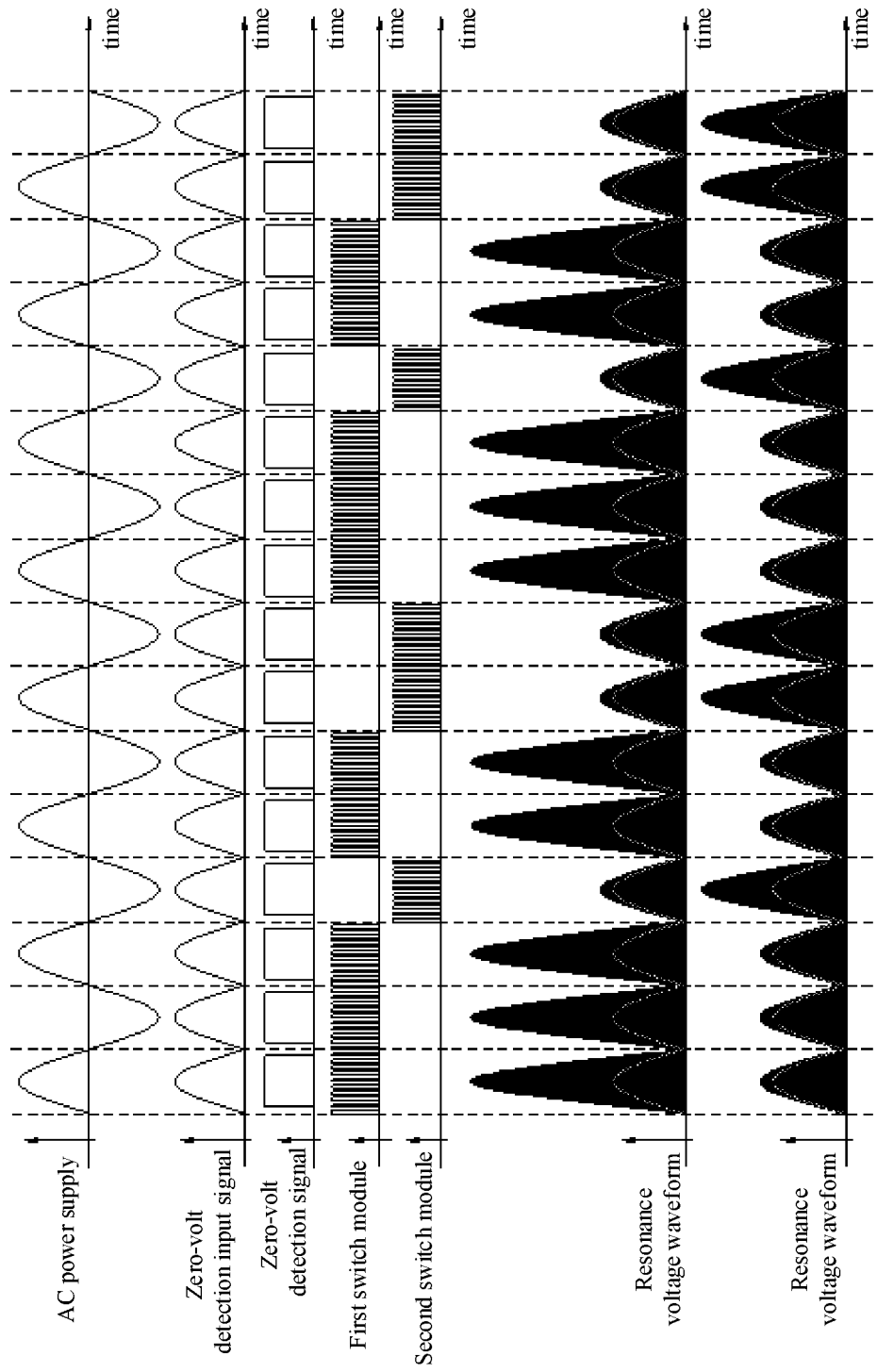
FIG. 8 is a resonant waveform diagram illustrating a method for controlling a power of an electromagnetic cooking appliance according to a fourth embodiment of the present disclosure.

Namely, as illustrated in FIG. 8, each heating period includes two first heating time periods and two second heating time periods, and the two first heating time periods respectively correspond to different heating powers, and the two second heating time periods respectively correspond to different heating powers (the numbers of the corresponding included half-wave periods of the AC power supply are different). The first switch module is turned on in the first half-wave period, the second half-wave period, the third half-wave period, the fifth half-wave period and the sixth halfwave period, for controlling the first coil disk to heat, while the second switch module is turned off; the second switch module is turned on in the fourth half-wave period, the seventh half-wave period and the eighth half-wave period, for controlling the second coil disk to heat, while the first switch module is turned off. It may make a pulsation of the electromagnetic heating power small.

In a fifth embodiment of the present disclosure, each heating period includes sixteen half-wave periods of the AC power supply and there are four first heating time periods and four second heating time periods. A first one of the four first heating time periods includes a first half-wave period, a second half-wave period and a third half-wave period, a first one of the four second heating time periods includes a fourth half-wave period, a second one of the four first heating time periods includes a fifth half-wave period, a sixth half-wave period and a seventh half-wave period, a second one of the four second heating time periods includes an eighth half-wave period, a third one of the four first heating time periods includes a ninth half-wave period and a tenth half-wave period, a third one of the four second heating time periods includes an eleventh half-wave period and a twelfth half-wave period, a fourth one of the four first heating time periods includes a thirteenth half-wave period and a fourteenth half-wave period, and a fourth one of the four second heating time periods includes a fifteenth half-wave period and a sixteenth half-wave period.

Figure 9:
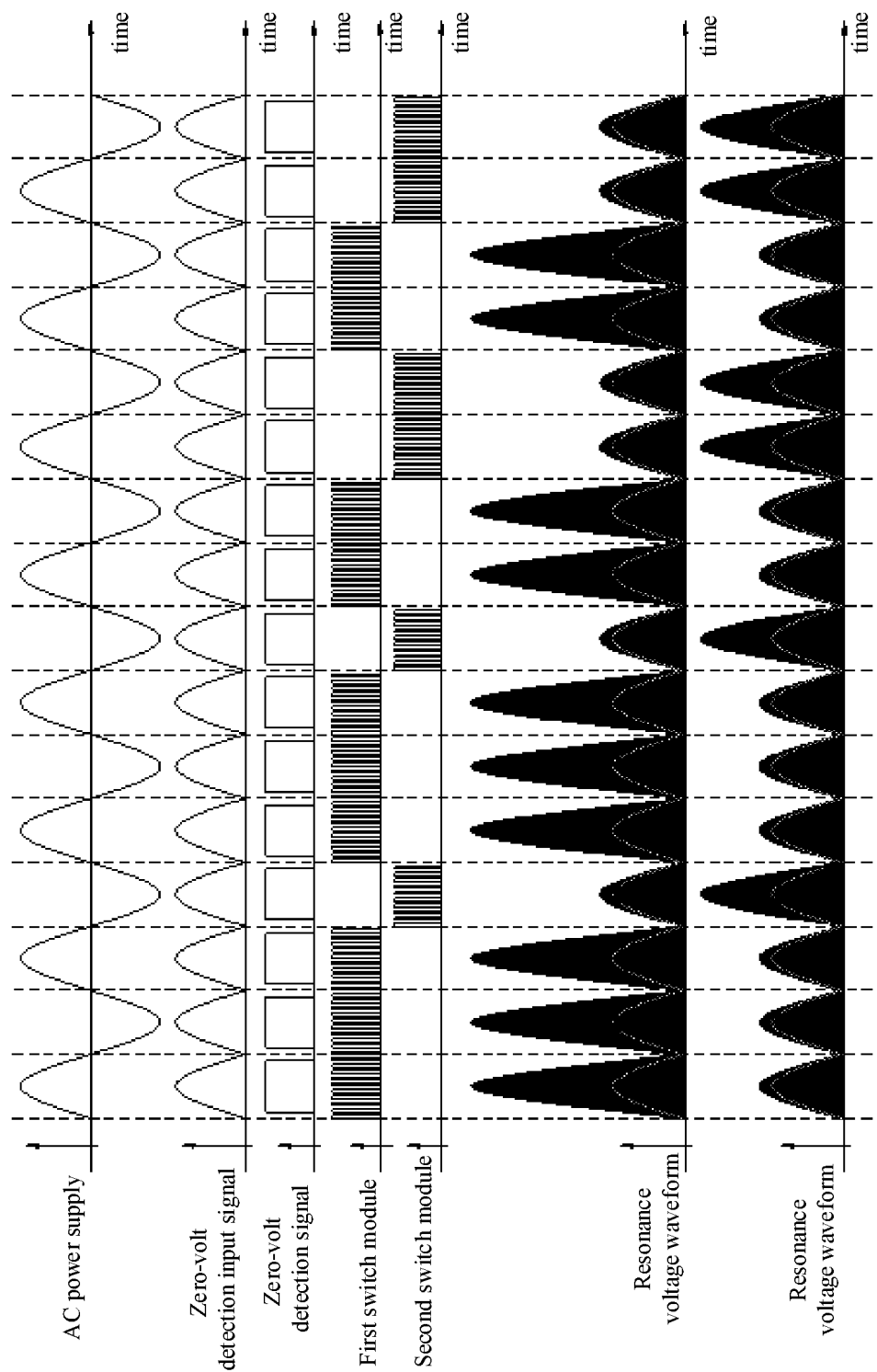
FIG. 9 is a resonant waveform diagram illustrating a method for controlling a power of an electromagnetic cooking appliance according to a fifth embodiment of the present disclosure.

Namely, as illustrated in FIG. 9, each heating period includes four first heating time periods and four second heating time periods, and the heating powers corresponding to the first one of the four first heating time periods and the second one of the four first heating time periods are different from the heating powers corresponding to the third one of the four first heating time periods and the fourth one of the four first heating time periods (the numbers of the corresponding included half-wave periods of the AC power supply are different), and the heating powers corresponding to the first one of the four second heating time periods and the second one of the four second heating time periods are different from the heating powers corresponding to the third one of the four second heating time periods and the fourth one of the four second heating time periods (the numbers of the corresponding included half-wave periods of the AC power supply are different). The first switch module is turned on in the first half-wave period, the second half-wave period, the third half-wave period, the fifth half-wave period, the sixth half-wave period, the seventh half-wave period, the ninth half-wave period, the tenth half-wave period, the thirteenth half-wave period and the fourteenth half-wave period, for controlling the first coil disk to heat, while the second switch module is turned off; the second switch module is turned on in the fourth half-wave period, the eighth half-wave period, the eleventh half-wave period, the twelfth half-wave period, the fifteenth half-wave period and the sixteenth half-wave period, for controlling the second coil disk to heat, while the first switch module is turned off. It may make a pulsation of the electromagnetic heating power small.

From the above, as illustrated in FIG. 5-FIG. 9, since the alternating magnetic field is generated around the first coil disk when the first coil disk is controlled to heat, a resonance voltage is generated in a corresponding resonance circuit of the first coil disk, and a resonance voltage (less than the resonance voltage generated by the corresponding resonant circuit of the first coil disk) is generated in a corresponding resonance circuit of the second coil disk even if the second coil disk does not heat. Likewise, when the second coil disk is controlled to heat, even if the first coil disk does not heat, the resonance circuit corresponding to the first coil disk also generates a resonance voltage.

It should be noted that if each heating period uses four half-wave periods of the AC power supply as one small period, and one, two or four small periods are one large period, when the heating periods of the four small periods are the same, the heating period is the small period. Otherwise it is two or four small periods. The large period constituted by the four small periods has the largest interference of harmonic current and voltage flicker, the large period constituted by the two small periods has the smaller interference of harmonic current and voltage flicker, and the small period has the smallest interference of harmonic current and voltage flicker.

In conclusion, with the method for controlling the power of the electromagnetic cooking appliance according to one or more embodiments of the present disclosure, the target power of the electromagnetic cooking appliance is obtained; the heating period of the electromagnetic cooking appliance is determined based on the target power, in which, each heating period comprises at least one first heating time period and at least one second heating time period; and the first coil disk is controlled to heat in the first heating time period, and the second coil disk is controlled to heat in the second heating time period, in which, each first heating time period is followed by the second heating time period to make the first coil disk and the second coil disk heat alternately. Therefore, the method may realize to switch heating in high speed on a plurality of coil disks, to heat with different powers, and further to reduce an interference of harmonic current and voltage flicker.

Further, one or more embodiments of the present disclosure provide a non-transitory computer readable storage medium having stored computer programs thereon. The method for controlling the power of the electromagnetic cooking appliance described above may be implemented when the programs are performed by a processor.

With the non-transitory computer readable storage medium according to one or more embodiments of the present disclosure, by performing the method for controlling the power of the electromagnetic cooking appliance described above, it may realize to switch heating in high speed on a plurality of coil disks, to heat with different powers, and further to reduce an interference of harmonic current and voltage flicker.

Further, one or more embodiments of the present disclosure provide an electromagnetic cooking appliance, including a first coil disk, a second coil disk, a memory, a processor and programs stored in the memory and executed by the processor for controlling a power of an electromagnetic cooking appliance. Each of the first coil disk and the second coil disk corresponds to an independent resonance circuit. The method for controlling the power of the electromagnetic cooking appliance described above may be implemented when the programs of controlling a power of the electromagnetic cooking appliance is performed.

It should be noted that for details of the electromagnetic cooking appliance according to the embodiments of the present disclosure not described herein, reference may be made to the details disclosed in the method for controlling the power of the electromagnetic cooking appliance according to the embodiments of the present disclosure, which are not repeated here.

With the electromagnetic cooking appliance according to one or more embodiments of the present disclosure, by the method for controlling the power of the electromagnetic cooking appliance described above, it may realize to switch heating in high speed on a plurality of coil disks, to heat with different powers, and further to reduce an interference of harmonic current and voltage flicker.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise", "axial", "radial" and "circumference" refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

In the present disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the present disclosure.

In the present disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for controlling a power of an electromagnetic cooking appliance, wherein, the electromagnetic cooking appliance comprises a first coil disk and a second coil disk, each of the first coil disk and the second coil disk corresponding to an independent resonance circuit, the method for controlling the power comprising:
    obtaining a target power of the electromagnetic cooking appliance;
    determining a heating period of the electromagnetic cooking appliance based on the target power, in which, each heating period comprises at least one first heating time period and at least one second heating time period;
    controlling the first coil disk to heat in the first heating time period, and controlling the second coil disk to heat in the second heating time period, in which, each first heating time period is followed by the second heating time period to make the first coil disk and the second coil disk heat alternately;
    generating, by the independent resonance circuit of the first coil disk, a resonance voltage, when the first coil disk is heating and the second coil disk is not heating; and
    generating, by the independent resonance circuit of the second coil disk, a resonance voltage, when the first coil disk is not heating and the second coil is heating, wherein each heating period comprises four half-wave periods of the AC power supply, in which, the first heating time period comprises a first half-wave period and a second half-wave period, the second heating time period comprises a third half-wave period, and both the first coil disk and the second coil disk stop heating in a fourth half-wave period.

2. The method according to claim 1, wherein each first heating time period and each second heating time period respectively correspond to at least one half-wave period of an input alternating current (AC) power supply.

3. The method according to claim 1, wherein each heating period comprises eight half-wave periods of the AC power supply, and there are two first heating time periods and two second heating time periods, in which, a first one of the two first heating time periods comprises a first half-wave period and a second half-wave period, a first one of the two second heating time periods comprises a third half-wave period, a second one of the two first heating time periods comprises a fifth half-wave period, a second one of the two second heating time periods comprises a sixth half-wave period, and both the first coil disk and the second coil disk stop heating in a fourth half-wave period, a seventh half-wave period and an eighth half-wave period.

4. The method according to claim 1, wherein each heating period comprises sixteen half-wave periods of the AC power supply, and there are four first heating time periods and four second heating time periods, in which, a first one of the four first heating time periods comprises a first half-wave period and a second half-wave period, a first one of the four second heating time periods comprises a third half-wave period, a second one of the four first heating time periods comprises a fifth half-wave period and a sixth half-wave period, a second one of the four second heating time periods comprises a seventh half-wave period, a third one of the four first heating time periods comprises a ninth half-wave period, a third one of the four second heating time periods comprises a tenth half-wave period, a fourth one of the four first heating time periods comprises a thirteenth half-wave period, a fourth one of the four second heating time periods comprises a fourteenth half-wave period, and both the first coil disk and the second coil disk stop heating in a fourth half-wave period, an eighth half-wave period, an eleventh half-wave period, a twelfth half-wave period, a fifteenth half-wave period and a sixteenth half-wave period.

5. The method according to claim 1, wherein each heating period comprises eight half-wave periods of the AC power supply, and there are two first heating time periods and two second heating time periods, in which, a first one of the two first heating time periods comprises a first half-wave period, a second half-wave period and a third half-wave period, a first one of the two second heating time periods comprises a fourth half-wave period, a second one of the two first heating time periods comprises a fifth half-wave period and a sixth half-wave period, and a second one of the two second heating time periods comprises a seventh half-wave period and an eighth half-wave period.

6. The method according to claim 1, wherein each heating period comprises sixteen half-wave periods of the AC power supply, and there are four first heating time periods and four second heating time periods, in which, a first one of the four first heating time periods comprises a first half-wave period, a second half-wave period and a third half-wave period, a first one of the four second heating time periods comprises a fourth half-wave period, a second one of the four first heating time periods comprises a fifth half-wave period, a sixth half-wave period and a seventh half-wave period, a second one of the four second heating time periods comprises an eighth half-wave period, a third one of the four first heating time periods comprises a ninth half-wave period and a tenth half-wave period, a third one of the four second heating time periods comprises an eleventh half-wave period and a twelfth half-wave period, a fourth one of the four first heating time periods comprises a thirteenth half-wave period and a fourteenth half-wave period, and a fourth one of the four second heating time periods comprises a fifteenth half-wave period and a sixteenth half-wave period.

7. The method according to claim 1, wherein the first coil disk and the second coil disk are disposed concentrically or adjacently.

8. An electromagnetic cooking appliance, comprising a first coil disk, a second coil disk, memory, a processor and programs stored in the memory and executed by the processor for controlling a power of an electromagnetic cooking appliance, wherein, each of the first coil disk and the second coil disk corresponds to an independent resonance circuit, and the programs are executed by the processor to perform operations including:
   obtaining a target power of the electromagnetic cooking appliance;
   determining a heating period of the electromagnetic cooking appliance based on the target power, in which, each heating period comprises at least one first heating time period and at least one second heating time period;
   controlling the first coil disk to heat in the first heating time period, and controlling the second coil disk to heat in the second heating time period, in which, each first heating time period is followed by the second heating time period to make the first coil disk and the second coil disk heat alternately;
   generating, by the independent resonance circuit of the first coil disk, a resonance voltage, when the first coil disk is heating and the second coil disk is not heating; and
   generating, by the independent resonance circuit of the second coil disk, a resonance voltage, when the first coil disk is not heating and the second coil is heating, wherein each heating period comprises four half-wave periods of the AC power supply, in which, the first heating time period comprises a first half-wave period and a second half-wave period, the second heating time period comprises a third half-wave period, and both the first coil disk and the second coil disk stop heating in a fourth half-wave period.

9. The electromagnetic cooking appliance according to claim 8, wherein each first heating time period and each second heating time period respectively correspond to at least one half-wave period of an input alternating current (AC) power supply.

10. The electromagnetic cooking appliance according to claim 8, wherein each heating period comprises eight half-wave periods of the AC power supply, and there are two first heating time periods and two second heating time periods, in which, a first one of the two first heating time periods comprises a first half-wave period and a second half-wave period, a first one of the two second heating time periods comprises a third half-wave period, a second one of the two first heating time periods comprises a fifth half-wave period, a second one of the two second heating time periods comprises a sixth half-wave period, and both the first coil disk and the second coil disk stop heating in a fourth half-wave period, a seventh half-wave period and an eighth half-wave period.

11. The electromagnetic cooking appliance according to claim 8, wherein each heating period comprises sixteen half-wave periods of the AC power supply, and there are four first heating time periods and four second heating time periods, in which, a first one of the four first heating time periods comprises a first half-wave period and a second half-wave period, a first one of the four second heating time periods comprises a third half-wave period, a second one of the four first heating time periods comprises a fifth half-wave period and a sixth half-wave period, a second one of the four second heating time periods comprises a seventh half-wave period, a third one of the four first heating time periods comprises a ninth half-wave period, a third one of the four second heating time periods comprises a tenth half-wave period, a fourth one of the four first heating time periods comprises a thirteenth half-wave period, a fourth one of the four second heating time periods comprises a fourteenth half-wave period, and both the first coil disk and the second coil disk stop heating in a fourth half-wave period, an eighth half-wave period, an eleventh half-wave period, a twelfth half-wave period, a fifteenth half-wave period and a sixteenth half-wave period.

12. The electromagnetic cooking appliance according to claim 8, wherein each heating period comprises eight half-wave periods of the AC power supply, and there are two first heating time periods and two second heating time periods, in which, a first one of the two first heating time periods comprises a first half-wave period, a second half-wave period and a third half-wave period, a first one of the two second heating time periods comprises a fourth half-wave period, a second one of the two first heating time periods comprises a fifth half-wave period and a sixth half-wave period, and a second one of the two second heating time periods comprises a seventh half-wave period and an eighth half-wave period.

13. The electromagnetic cooking appliance according to claim 8, wherein each heating period comprises sixteen half-wave periods of the AC power supply, and there are four first heating time periods and four second heating time periods, in which, a first one of the four first heating time periods comprises a first half-wave period, a second half-wave period and a third half-wave period, a first one of the four second heating time periods comprises a fourth half-wave period, a second one of the four first heating time periods comprises a fifth half-wave period, a sixth half-wave period and a seventh half-wave period, a second one of the four second heating time periods comprises an eighth half-wave period, a third one of the four first heating time periods comprises a ninth half-wave period and a tenth half-wave period, a third one of the four second heating time periods comprises an eleventh half-wave period and a twelfth half-wave period, a fourth one of the four first heating time periods comprises a thirteenth half-wave period and a fourteenth half-wave period, and a fourth one of the four second heating time periods comprises a fifteenth half-wave period and a sixteenth half-wave period.

14. The electromagnetic cooking appliance according to claim 8, wherein the first coil disk and the second coil disk are disposed concentrically or adjacently.

15. A non-transitory computer readable storage medium having stored computer programs thereon for controlling a power of an electromagnetic cooking appliance including a first coil disk, a second coil disk, each of the first coil disk and the second coil disk corresponding to an independent resonance circuit, and a processor, and the programs are executed by the processor to perform operations including:
   obtaining a target power of the electromagnetic cooking appliance;
   determining a heating period of the electromagnetic cooking appliance based on the target power, in which, each heating period comprises at least one first heating time period and at least one second heating time period;
   controlling the first coil disk to heat in the first heating time period, and controlling the second coil disk to heat in the second heating time period, in which, each first heating time period is followed by the second heating time period to make the first coil disk and the second coil disk heat alternately;

generating, by the independent resonance circuit of the first coil disk, a resonance voltage, when the first coil disk is heating and the second coil disk is not heating; and generating, by the independent resonance circuit of the second coil disk, a resonance voltage, when the first coil disk is not heating and the second coil is heating, wherein each heating period comprises four half-wave periods of the AC power supply, in which, the first heating time period comprises a first half-wave period and a second half-wave period, the second heating time period comprises a third half-wave period, and both the first coil disk and the second coil disk stop heating in a fourth half-wave period.

16. The non-transitory computer readable storage medium according to claim 15, wherein each first heating time period and each second heating time period respectively correspond to at least one half-wave period of an input alternating current (AC) power supply.

17. The non-transitory computer readable storage medium according to claim 15, wherein each heating period comprises eight half-wave periods of the AC power supply, and there are two first heating time periods and two second heating time periods, in which, a first one of the two first heating time periods comprises a first half-wave period and a second half-wave period, a first one of the two second heating time periods comprises a third half-wave period, a second one of the two first heating time periods comprises a fifth half-wave period, a second one of the two second heating time periods comprises a sixth half-wave period, and both the first coil disk and the second coil disk stop heating in a fourth half-wave period, a seventh half-wave period and an eighth half-wave period.

* * * * *